United States Patent
Lee et al.

(10) Patent No.: US 9,699,695 B2
(45) Date of Patent: *Jul. 4, 2017

(54) SELECTIVELY PROVIDING SYSTEM INFORMATION IN A HETEROGENEOUS NETWORK ENVIRONMENT

(71) Applicant: KT CORPORATION, Gyeonggi-do (KR)

(72) Inventors: Ki-Ho Lee, Gyeonggi-do (KR); Yong-Gyoo Lee, Seoul (KR); Yung-Ha Ji, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/488,359

(22) Filed: Sep. 17, 2014

(65) Prior Publication Data
US 2015/0004983 A1    Jan. 1, 2015

Related U.S. Application Data

(63) Continuation of application No. 13/689,825, filed on Nov. 30, 2012, now Pat. No. 8,868,086.

(30) Foreign Application Priority Data

Nov. 30, 2011 (KR) .......................... 10-2011-0127193

(51) Int. Cl.
*H04W 40/00* (2009.01)
*H04W 36/00* (2009.01)
(Continued)

(52) U.S. Cl.
CPC ....... *H04W 36/0066* (2013.01); *H04W 36/04* (2013.01); *H04W 36/08* (2013.01);
(Continued)

(58) Field of Classification Search
CPC ..... H04W 36/04; H04W 36/06; H04W 72/04; H04W 36/0005; H04W 36/0011; H04W 36/0066; H04W 36/0083; H04W 36/14
(Continued)

(56) References Cited

U.S. PATENT DOCUMENTS 5,864,760 A    1/1999    Gilhousen et al.
6,081,714 A    6/2000    Wakizaka
(Continued)

FOREIGN PATENT DOCUMENTS

KR    10-0304781 B1    9/2001
KR    10-2005-0068400 A    7/2005
(Continued)

OTHER PUBLICATIONS

ETSI TS 123 272 V8.1.0, "Digital cellular telecommunications system (Phase 2+); Universal Mobile Telecommunications System (UMTS); Circuit Switched (CS) fallback in Evolved Packet System (EPS); Stage 2", ETSI, Nov. 2008, pp. 1-47.
(Continued)

*Primary Examiner* — Olumide T Ajibade Akonai
(74) *Attorney, Agent, or Firm* — IP Legal Services, LLC

(57) ABSTRACT

Described embodiments provide an apparatus and method for selectively providing system information in a heterogeneous network environment including a first network overlaid on a second network. The apparatus may include a location determination unit, a mapping table, and a signal processor. The location determination unit may be configured to determine a first network base station in the first network. The mapping table may be configured to store information on at least one second network cell in a second network, which is spatially in a comparatively close distance to each first network base station in the first network. The signal processor may be configured to determine at least one
(Continued)

second network cell spatially close to the determined first network base station based on the mapping table and to transmit system information of the at least one second network cell to the user equipment.

18 Claims, 5 Drawing Sheets

(51) Int. Cl.
  *H04W 36/04* (2009.01)
  *H04W 36/08* (2009.01)
  *H04W 48/10* (2009.01)
  *H04W 36/06* (2009.01)
  *H04W 48/12* (2009.01)

(52) U.S. Cl.
  CPC ........ *H04W 48/10* (2013.01); *H04W 36/0005* (2013.01); *H04W 36/0083* (2013.01); *H04W 36/06* (2013.01); *H04W 48/12* (2013.01)

(58) Field of Classification Search
  USPC .... 455/435.1, 436, 437, 438, 439, 440, 442, 455/443, 444, 446, 448, 449, 456.1, 515, 455/514; 370/328, 329, 331
  See application file for complete search history.

(56) References Cited

U.S. PATENT DOCUMENTS

| | | | |
|---|---|---|---|
| 6,466,790 | B2 | 10/2002 | Haumont et al. |
| 6,473,442 | B1 | 10/2002 | Lundsjoe et al. |
| 6,526,028 | B1 | 2/2003 | Kondo |
| 6,728,919 | B1 | 4/2004 | Kondo et al. |
| 6,845,238 | B1 | 1/2005 | Muller |
| 6,975,604 | B1 | 12/2005 | Ishida et al. |
| 7,072,655 | B2 | 7/2006 | Ikeda et al. |
| 7,200,403 | B2 | 4/2007 | Hamabe |
| 7,796,514 | B2 | 9/2010 | Noriega |
| 8,045,926 | B2 | 10/2011 | Martikkala et al. |
| 8,149,895 | B2 | 4/2012 | Bolourchi et al. |
| 8,165,089 | B2 | 4/2012 | Jung et al. |
| 8,379,567 | B2 | 2/2013 | Cho et al. |
| 8,406,193 | B2 | 3/2013 | Cho et al. |
| 8,446,869 | B2 | 5/2013 | Lee et al. |
| 8,472,921 | B2 | 6/2013 | Yang et al. |
| 8,509,783 | B2 | 8/2013 | Iwamura |
| 8,867,432 | B2 | 10/2014 | Lee et al. |
| 8,868,086 | B2 * | 10/2014 | Lee ........................ H04W 36/08 370/328 |
| 2001/0011019 | A1 | 8/2001 | Jokimies |
| 2002/0001296 | A1 | 1/2002 | Lee et al. |
| 2003/0002467 | A1 | 1/2003 | Leung |
| 2003/0022683 | A1 | 1/2003 | Beckmann et al. |
| 2003/0035423 | A1 | 2/2003 | Beckmann et al. |
| 2004/0001436 | A1 | 1/2004 | Cuffaro et al. |
| 2004/0076179 | A1 | 4/2004 | Kaminski et al. |
| 2004/0114593 | A1 | 6/2004 | Dick et al. |
| 2004/0203926 | A1 | 10/2004 | Ruutu et al. |
| 2004/0235510 | A1 | 11/2004 | Elicegui et al. |
| 2005/0005095 | A1 | 1/2005 | Meandzija et al. |
| 2005/0043050 | A1 | 2/2005 | Lee et al. |
| 2005/0048980 | A1 | 3/2005 | Kumar et al. |
| 2005/0053035 | A1 | 3/2005 | Kwak et al. |
| 2005/0073988 | A1 | 4/2005 | Kroth et al. |
| 2005/0176437 | A1 | 8/2005 | Mir |
| 2005/0201407 | A1 | 9/2005 | Kim et al. |
| 2005/0249322 | A1 | 11/2005 | Gerlach |
| 2006/0003696 | A1 | 1/2006 | Diaz Cervera et al. |
| 2006/0077923 | A1 | 4/2006 | Niwano |
| 2006/0092872 | A1 | 5/2006 | Lee et al. |
| 2006/0104229 | A1 | 5/2006 | Vannithamby |
| 2006/0178153 | A1 | 8/2006 | Tenny et al. |
| 2007/0087689 | A1 | 4/2007 | Alles et al. |
| 2007/0184841 | A1 | 8/2007 | Choi et al. |
| 2007/0190997 | A1 | 8/2007 | Moon et al. |
| 2008/0139204 | A1 | 6/2008 | Hsieh et al. |
| 2008/0181182 | A1 | 7/2008 | Carichner et al. |
| 2008/0199183 | A1 | 8/2008 | Liu et al. |
| 2008/0219222 | A1 | 9/2008 | Lo et al. |
| 2008/0310404 | A1 | 12/2008 | Valme et al. |
| 2009/0041056 | A1 | 2/2009 | Okamoto et al. |
| 2009/0135778 | A1 | 5/2009 | Lee et al. |
| 2009/0233616 | A1 | 9/2009 | Kwon et al. |
| 2009/0238143 | A1 | 9/2009 | Mukherjee et al. |
| 2009/0291632 | A1 | 11/2009 | Braithwaite et al. |
| 2009/0310568 | A1 | 12/2009 | Chen et al. |
| 2010/0008324 | A1 | 1/2010 | Lee et al. |
| 2010/0015978 | A1 | 1/2010 | Yoon et al. |
| 2010/0067442 | A1 | 3/2010 | Van der Wal et al. |
| 2010/0075679 | A1 | 3/2010 | Tenny et al. |
| 2010/0113032 | A1 | 5/2010 | Lee et al. |
| 2010/0128663 | A1 | 5/2010 | Kuroda et al. |
| 2010/0136979 | A1 | 6/2010 | Yang et al. |
| 2010/0144334 | A1 | 6/2010 | Gorokhov et al. |
| 2010/0178916 | A1 | 7/2010 | Jamadagni |
| 2010/0216474 | A1 | 8/2010 | Park et al. |
| 2010/0273485 | A1 | 10/2010 | Huang et al. |
| 2010/0278146 | A1 | 11/2010 | Aoyama et al. |
| 2010/0278150 | A1 | 11/2010 | Park et al. |
| 2011/0013560 | A1 | 1/2011 | Zhang et al. |
| 2011/0016214 | A1 | 1/2011 | Jackson |
| 2011/0022812 | A1 | 1/2011 | van der Linden et al. |
| 2011/0092214 | A1 | 4/2011 | Iwamura |
| 2011/0096736 | A1 | 4/2011 | Kwon et al. |
| 2011/0116513 | A1 | 5/2011 | Gilson |
| 2011/0176477 | A1 | 7/2011 | Lee et al. |
| 2011/0176485 | A1 | 7/2011 | Pudney et al. |
| 2011/0207459 | A1 | 8/2011 | Ramasamy et al. |
| 2011/0237272 | A1 | 9/2011 | Gorokhov et al. |
| 2011/0274040 | A1 | 11/2011 | Pani et al. |
| 2011/0300887 | A1 | 12/2011 | Osterling |
| 2011/0312355 | A1 | 12/2011 | Cheng et al. |
| 2012/0039216 | A1 | 2/2012 | Li et al. |
| 2012/0221683 | A1 | 8/2012 | Ferris |
| 2012/0322477 | A1 | 12/2012 | Kang et al. |
| 2013/0089021 | A1 | 4/2013 | Gaal et al. |
| 2013/0103844 | A1 | 4/2013 | Bulut et al. |
| 2013/0163416 | A1 | 6/2013 | Lee et al. |
| 2013/0242951 | A1 | 9/2013 | Lee et al. |
| 2014/0052864 | A1 | 2/2014 | Van Der Linden et al. |

FOREIGN PATENT DOCUMENTS

| | | |
|---|---|---|
| KR | 10-2005-0121136 A | 12/2005 |
| KR | 10-2006-0016016 A | 2/2006 |
| KR | 10-2006-0040237 A | 5/2006 |
| KR | 10-2007-0079633 A | 8/2007 |
| KR | 10-2007-0110348 A | 11/2007 |
| KR | 10-2008-0026855 A | 3/2008 |
| KR | 10-2008-0041543 A | 5/2008 |
| KR | 10-2008-0041545 A | 5/2008 |
| KR | 10-2008-0064691 A | 7/2008 |
| KR | 10-2008-0080801 A | 9/2008 |
| KR | 10-0873386 B1 | 12/2008 |
| KR | 10-2009-0034261 A | 4/2009 |
| KR | 10-2009-0073443 A | 7/2009 |
| KR | 10-0920894 B1 | 10/2009 |
| KR | 10-2010-0003664 A | 1/2010 |
| KR | 10-2010-0004833 A | 1/2010 |
| KR | 10-2010-0021156 A | 2/2010 |
| KR | 10-2010-0029869 A | 3/2010 |
| KR | 10-2010-0035088 A | 4/2010 |
| KR | 10-2010-0048841 A | 5/2010 |
| KR | 10-2010-0060353 A | 6/2010 |
| KR | 10-2010-0066875 A | 6/2010 |
| KR | 10-2010-0087382 A | 8/2010 |
| KR | 10-2010-0092742 A | 8/2010 |
| KR | 10-0976943 B1 | 8/2010 |
| KR | 10-2010-0126776 A | 12/2010 |
| KR | 10-2010-0126818 A | 12/2010 |
| KR | 10-2010-0133821 A | 12/2010 |
| KR | 10-1030897 B1 | 4/2011 |
| KR | 10-2011-0094140 A | 8/2011 |
| KR | 10-2011-0097702 A | 8/2011 |
| KR | 10-2011-0099327 A | 9/2011 |

(56) References Cited

FOREIGN PATENT DOCUMENTS

| WO | 20081110924 A2 | 9/2008 |
| WO | 2010/068769 A1 | 6/2010 |
| WO | 2010/123270 A2 | 10/2010 |
| WO | 2010/127365 A1 | 11/2010 |
| WO | 2011/022733 A2 | 2/2011 |

OTHER PUBLICATIONS

Ralf Irmer et al., "Coordinated multipoint: Concepts, Performance, and Field Trial Results", IEEE Communications Magazine, Feb. 2011, pp. 102-111, vol. 49, Issue 2.

* cited by examiner

SELECTIVELY PROVIDING SYSTEM INFORMATION IN A HETEROGENEOUS NETWORK ENVIRONMENT

CROSS REFERENCE TO PRIOR APPLICATIONS

The present application is continuation application of U.S. patent application Ser. No. 13/689,825 (filed on Nov. 30, 2012), which claims priority under 35 U.S.C. §119 to Korean Patent Application No. 10-2011-0127193 (filed on Nov. 30, 2011), which is hereby incorporated by reference in its entirety.

The subject meter of this application is related to U.S. patent application Ser. No. 13/326,734 filed Dec. 15, 2011, U.S. patent application Ser. No. 13/661,004 filed Oct. 25, 2012, U.S. patent application Ser. No. 13/660,988 filed Oct. 25, 2012, and U.S. patent application Ser. No. 13/587,742 filed Aug. 16, 2012, the teachings of which are incorporated herein in their entirety by reference.

FIELD OF THE INVENTION

The present invention relates to communications and, in particular, to selectively providing system information in heterogeneous network environment for reducing delay in signal processing.

BACKGROUND OF THE INVENTION

Long term evolution (LTE) may be a standard for wireless data communication technology that delivers a high data rate, low latency and packet optimized radio access technology. LTE, however, supports only a packet switched (PS) service while a universal mobile telecommunications system radio access network (UTRAN) supports both of a circuit switched (CS) service and a packet switched (PS) service. In order to provide a CS service in a LTE network, circuit switched (CS) fallback may be employed in the LTE network.

The CS fallback may enable the provisioning of voice and other CS services by reuse of a GSM/EDGE radio access network (GERAN) or a UTRAN CS infrastructure when user equipment is served by a LTE network. GSM may by an abbreviation of a global system for mobile communications and EDGE may be abbreviation of enhanced data rates for GSM evolution. The CS fallback is generally only available if LTE service coverage is overlapped with service coverage of a GERAN or a UTRAN CS network. For example, in the LTE network, a CS fallback procedure may hand over user equipment from a serving LTE cell to an associated non-LTE cell in order to process a mobile originated (MO) call or a mobile terminated (MT) call while the user equipment is camping on the serving LTE cell. The non-LTE cell may be a GERAN cell or a UTRAN cell. The LTE cell may be mapped to a corresponding non-LTE cell with a one to one relationship. A CS fallback call may be transferred from the serving LTE cell to the corresponding non-LTE cell in the CS fallback procedure.

Typically, a cell size of a LTE cell is much greater than that of a UTRAN cell. Accordingly, one LTE cell may be overlaid on multiple UTRAN cells. In such a heterogeneous network environment, user equipment may be redirected from such a LTE cell to a UTRAN cell when the user equipment continuously has a poor reception signal quality for a predetermined duration or when the user equipment needs to perform a CS fallback procedure. In this case, it may be required to provide system information of UTRAN cells that are spatially associated with the serving LTE cell or that are adjacent to a location of user equipment. Typically, a serving LTE cell provides system information of UTRAN cells without consideration of the location of the serving LTE cell or the location of the user equipment. Accordingly, radio resources may be wasted for providing unnecessary system information and related signal processes may be delayed for processing unnecessary system information.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, system information may be selectively provided in a heterogeneous network environment.

In accordance with another aspect of the present invention, a location of user equipment may be considered to selectively provide system information of UTRAN cells.

In accordance with another aspect of the present invention, user equipment may be provided with system information of UTRAN cells only adjacent to a LTE base station where the user equipment is located.

In accordance with at least one embodiment of the present invention, an apparatus may be provided for selectively providing system information in a heterogeneous network environment including a first network overlaid on a second network. The apparatus may include a location determination unit, a mapping table, and a signal processor. The location determination unit may be configured to receive an uplink signal transmitted from user equipment and to determine a first network base station in the first network, which is located in a comparatively close distance to the user equipment. The mapping table may be configured to store information on at least one second network cell in a second network, which is spatially in a comparatively close distance to each first network base station in the first network. The signal processor may be configured to determine at least one second network cell spatially close to the determined first network base station based on the mapping table, to obtain system information of the determined at least one second network cell, and to transmit the obtained system information to the user equipment.

A first network cell of the first network may be overlaid on multiple second network cells of the second network in the heterogeneous network environment. One first network cell may include multiple first network radio units and one second network cell includes one second network radio unit.

The radio unit may be a remote radio head.

The first network may be a long term evolution (LTE) network and the second network may be a universal mobile telecommunications system radio access network (UTRAN).

The apparatus may further include an input unit configured to receive the uplink signals transmitted from the user equipment and to provide the received uplink signals to the location determination unit.

The location determination unit may be configured to extract one or more sounding reference signals from the received uplink signals and to determine the first network base station located near to the user equipment based on each extracted sounding reference signal.

The mapping table may be configured to store identifications of second network cells spatially close to each first network base station. The identifications of second network cells may be mapped to a corresponding first network base station spatially closed to the second network cells.

The signal processor may be configured to transmit the obtained system information through a radio resource control (RRC) connection release message.

The apparatus may be included in a digital unit in the first network.

The location determination unit may be configured to determine the first network base station spatially close to the user equipment when the user equipment is redirected from the first network to the second network.

In accordance with another embodiment of the present invention, a method may be provided for selectively providing system information in a heterogeneous network environment including a first network overlaid on a second network. The method may include receiving an uplink signal transmitted from user equipment, determining a first network base station in the first network located in a comparatively close distance to the user equipment, determining at least one second network cell spatially close to the determined first network base station based on a mapping table, obtaining system information of the determined at least one second network cell, and providing the obtained system information to the user equipment.

The method may include storing, by the mapping table, information on at least one second network cell in a second network spatially in a comparatively close distance to each first network base station in the first network.

The method may include overlaying a first network cell of the first network on multiple second network cells of the second network in the heterogeneous network environment. One first network cell may include multiple first network radio units and one second network cell includes one second network radio unit.

The first network may be a long term evolution (LTE) network and the second network is a universal mobile telecommunications system radio access network (UTRAN).

The determining a first network base station may include extracting one or more sounding reference signals from the received uplink signals and determining the first network base station located near to the user equipment based on each extracted sounding reference signal.

The providing the obtained system information may include including the obtained system information in a radio resource control (RRC) connection release message and transmitting the RRC connection release message to the user equipment.

Prior to the determining a first network base station, the method may further include initiating a network redirection procedure that redirects the user equipment from the first network to the second network.

The network redirection procedure may be initiated for at least one of when the user equipment continuously has a comparatively low signal quality for a predetermined duration and when the user equipment performs a circuit switched (CS) fallback procedure.

In accordance with still another embodiment of the present invention, an apparatus may be provided for selectively providing system information of cells in a universal mobile telecommunication system radio access network (UTRAN) in a heterogeneous network environment including a long term evolution (LTE) network overlaid on the UTRAN. The apparatus may include a location determination unit, a mapping table, and a signal processor. The location determination unit may be configured to receive an uplink signal transmitted from user equipment and to determine a LTE base station located in a comparatively close distance to the user equipment. The mapping table may be configured to store information on at least one UTRAN cell spatially in a comparatively close distance to each LTE base station overlaid on UTRAN cells. The signal processor may be configured to determine at least one UTRAN cell spatially close to the determined LTE base station based on the mapping table, to obtain system information of the determined at least one UTRAN cell, and to transmit the obtained system information to the user equipment.

The location determination unit may be configured to extract sounding reference signal from the received uplink signals and to determine the LTE base station located near to the user equipment based on the extracted sounding reference signals. The signal processor may be configured to transmit the obtained system information through a radio resource control (RRC) connection release message.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
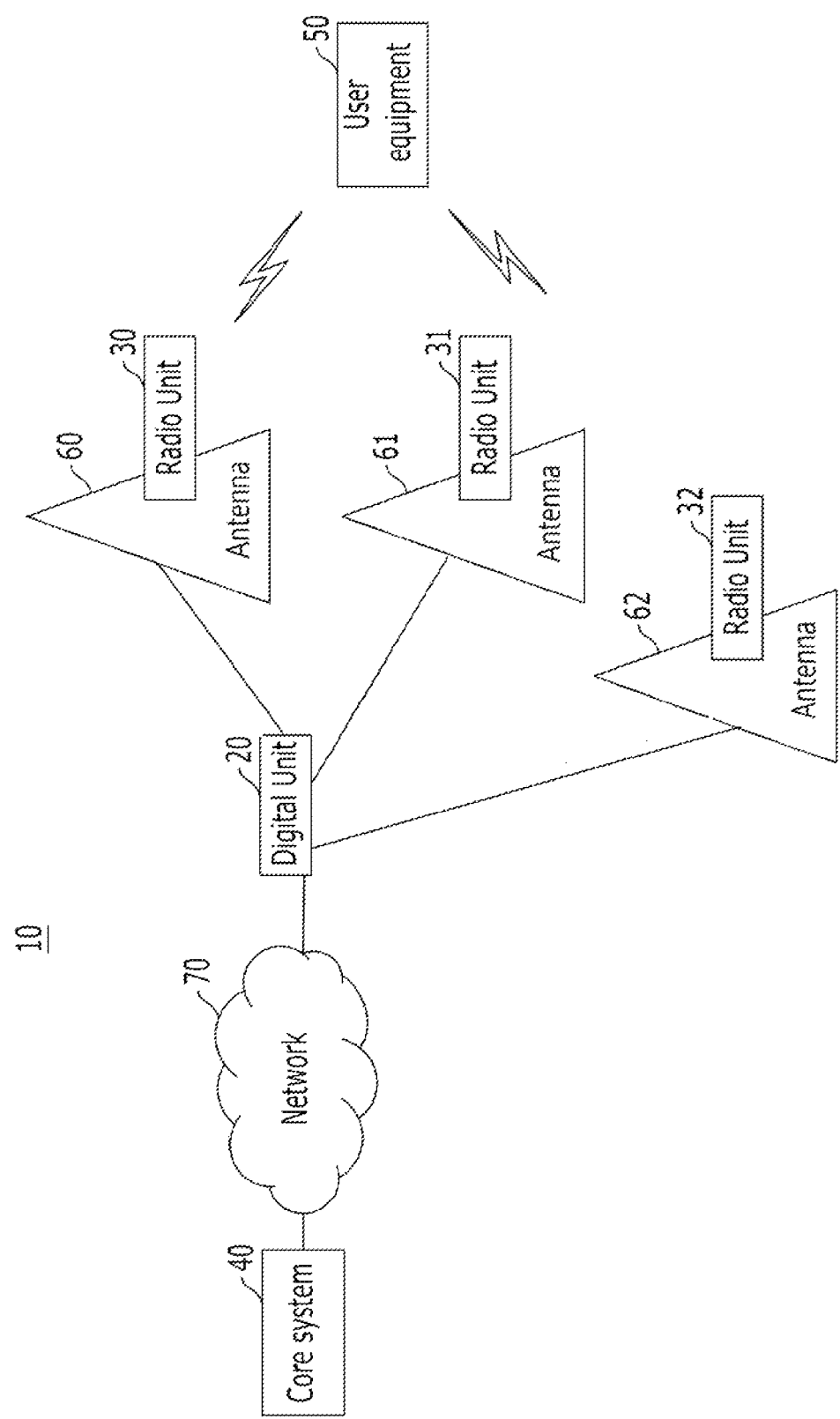
FIG. 1 shows a LTE network in accordance with at least one embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

The term "user equipment" as used herein may refer to any of a terminal, a mobile station (MS), a mobile terminal (MT), a subscriber station (SS), a portable subscriber station (PSS), and an access terminal (AT), and may include some or all of the functions thereof.

The term "base station (BS)" as used herein may refer to any of an access point (AP), a radio access station (RAS), a node B, an evolved node B (eNodeB), a base transceiver station (BTS), and a mobile multihop relay (MMR)-BS, and may include some or all of the functions thereof.

For convenience and ease of understanding, a heterogeneous network environment will be described as a long term evolution (LTE) network overlaid on a UMTS radio access network (UTRAN), but the present invention is not limited thereto. Hereinafter, such heterogeneous network environment will be described with reference to FIG. 1 to FIG. 3.

FIG. 1 shows a LTE network in accordance with at least one embodiment of the present invention.

Referring to FIG. 1, LTE network 10 may include may include digital unit 20, plurality of radio units 30, 31, and 32, and core system 40 in accordance with at least one embodiment of the present invention. Digital unit 20 may be spatially separated from plurality of radio units 30, 31, and 32 and installed at different locations in accordance with at least one embodiment of the present invention. For example, digital unit 20 may be installed in a base station (not shown) or in a digital unit center (not shown) of a central office with a switching system. Digital unit 20 may be coupled to core system 40 through communication network 70. Such digital unit 20 may be coupled to a plurality of radio units 30, 31, and 32 through an optical interface, but the present invention is not limited thereto. Digital unit 20 may be referred to as a baseband unit.

Digital unit 20 may transmit and receive signals to/from radio units 30, 31, and 32. Digital unit 20 may be constituent elements for process signals digitally. For example, digital unit 20 may encrypt and decrypt the signals. The signals may be a radio digital signal generated based on with $3^{rd}$ generation partnership project (3GPP), worldwide interoperability for microwave access (WiMAX), Wireless Broadband (WiBro), and/or long term evolution (LTE), but the present invention is not limited thereto. Digital unit 20 may be connected to core system 40 through network 70.

As described, digital unit 20 may be spatially separated from radio units 30, 31, and 32 and installed at different locations such as a corresponding base station and a digital unit center (not shown). Digital unit 20 may be installed at a corresponding base station (not shown) and the base station may be connected to core system 40 through communication network 70. The present invention, however, is not limited thereto. Digital unit 20 may be installed at a digital unit center (not shown). The digital unit center may include a plurality of digital units in a cloud computing center system. The digital units may be centralized in the digital unit center installed at a central office with a switching system in a cloud computing center system. Accordingly, digital unit 20 may be a virtualized base station. Digital unit 20 may be coupled to corresponding radio units 30, 31, and 32 through an optical interface, but the present invention is not limited thereto. Digital unit 20 may be coupled to a plurality of radio units 30, 31, and 32 and manage and control coupled radio units 30, 31, and 32, but the present invention is not limited thereto. Digital unit 20 may be coupled to one radio unit.

Radio units 30, 31, and 32 may be distributed and installed at various locations with corresponding antennas 60, 61, and 62. For example, radio units 30, 31, and 32 may be installed with at least one antenna at each floor of an office building in accordance with embodiments of the present invention. Such a structure may enable to form various types of cells and reduce coverage holes. Radio units 30, 31, and 32 may be controlled and managed by coupled digital unit 20. For example, each one of radio units 30, 31, and 32 may receive signals from digital unit 20, process the received signals, and transmit the processed signal to user equipment 50. Furthermore, radio units 30, 31, and 32 may receive signals from user equipment 50, process the received signals, and transmit the processed signals to digital unit 20. In general, radio units 30, 31, and 32 may be a set of elements for processing a radio frequency signal. For example, radio units 30, 31, and 32 may convert digital signals from digital unit 20 to a radio frequency signal according to a frequency band, amplify the radio frequency signal, and transmit the radio frequency signal through antennas (not shown). Accordingly, radio units 30, 31, and 32 may include a converter and an amplifier.

In accordance with at least one embodiment of the present invention, digital unit 20 may control signals transmission in radio units 30, 31, and 32. For example, digital unit 20 may use multiple radio units to simultaneously transmit a data signal to user equipment through a same channel when the user equipment is located in overlapping service areas of the multiple radio units. In this case, digital unit 20 may allocate the same radio resource to related radio units to transmit a data signal to user equipment. For example, the multiple radio units may transmit the same data signal to the user equipment through the same channel in response to the control of digital unit 20.

Core system 40 may be coupled to digital unit 20 through network 70. Core system 40 may manage connection between digital unit 20 and an external network. Core system 40 may include a switching center (not shown). Such LTE network 10 may form various cell structures because radio units 30, 31, and 32 with antennas 60, 61, and 62 are spatially separated from digital unit 20 and installed at different locations. Hereinafter, such cell structure in accordance with embodiments of the present invention will be described with reference to FIG. 2.

Figure 2:
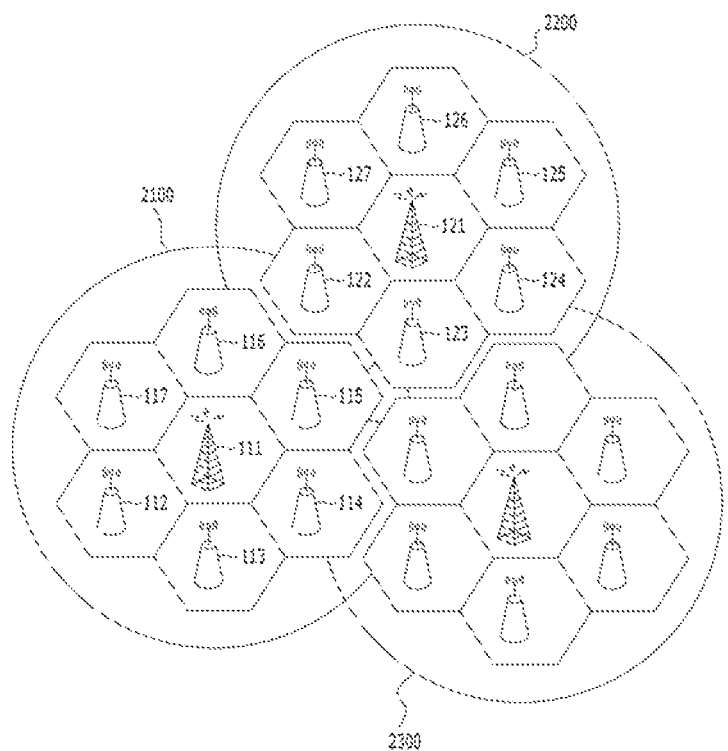
FIG. 2 shows a cell structure in accordance with at least one embodiment of the present invention.

FIG. 2 shows a cell structure in accordance with at least one embodiment of the present invention.

Referring to FIG. 2, LTE network 10 may include a plurality of cells 2100, 2200, and 2300. Each one of cells 2100, 2200, and 2300 may include one macro radio unit and a plurality of cooperative radio units. For example, cell 2100 may include macro radio unit 111 and a plurality of cooperative radio units 112, 113, 114, 115, 116, and 117. Furthermore, cell 2200 may include macro radio unit 121 and a plurality of cooperative radio units 122, 123, 124, 125, 126, and 127. The cell structure of cell 2100 will be representatively described, hereinafter. Cell 2200 and Cell 2300 may have the similar cell structure of cell 2100.

As described, cell 2100 may include macro radio unit 111 and a plurality of cooperative radio units 112, 113, 114, 115, 116, and 117. Macro radio unit 111 may manage overall communication processes in cell 2100. Macro radio unit 111 may be operated as a repeater mode and a typical sector mode. Macro radio unit 111 may always duplicate a signal and transmit the duplicated signals in the repeater mode. Macro radio unit 111 may transmit a signal to all user equipment located within cell 2100 with high transmission power.

Cooperative radio units 112 to 117 may transmit and receive signals to/from one or more user equipment located within a comparatively short distance therefrom. Cooperative radio units 112 to 117 may transmit signals with transmission power smaller than that of macro radio unit 111. Cooperative radio units 112 to 117 may transmit signals when required.

Such macro radio unit 111 and plurality of cooperative radio units 112 to 117 may be controlled by corresponding digital unit 20. In accordance with at least one embodiment of the present invention, digital unit 20 may control and manage radio unit 111 and cooperative radio units 112 to 117 in the same cell in order to efficiently use radio resources and to maximize radio capacity.

As shown, one LTE cell may include at least one macro radio unit and a plurality of cooperative radio units. All radio units included in each LTE cell may be controlled by digital unit 20. Such radio units 111 to 117 may transmit a various types of radio signals. The radio signals may include a control signal, a data signal, and a reference signal. The control signal may use to inform system information and data channel allocation information. The data signal may be used to transmit user data. The reference signal may be used for channel estimation.

In the same cell, a plurality of cooperative radio units and a macro radio unit. For example, in cell 2200, cooperative radio units 122 to 126 may transmit control signals and reference signals, which are identical to those transmitted from macro radio unit 121. Radio units in one cell may transmit a control signal and a reference signal, different from those transmitted from radio units in the other cells. For example, radio units 121 to 126 in cell 2200 may transmit control signals and reference signals, which are different from those transmitted from radio units 111 to 116 in cell 2100.

As described, the LTE cell may include a plurality of cooperative radio units as well as a macro radio unit. Accordingly, user equipment may effectively receive a control signal and a reference signal, which are commonly transmitted from a plurality of radio units in the same cell.

Figure 3:
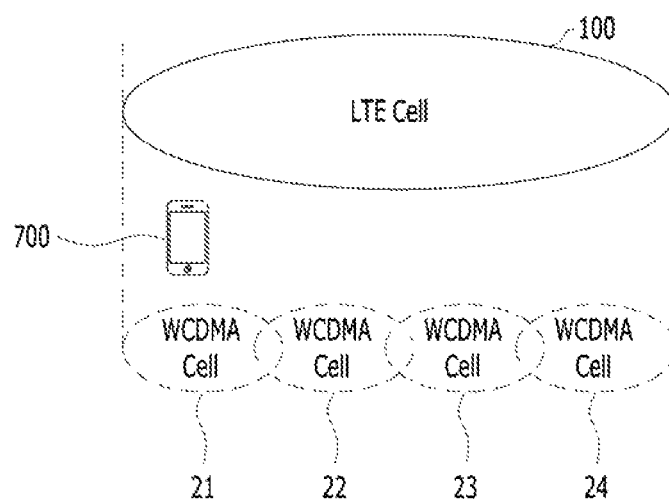
FIG. 3 shows a heterogeneous network environment including a LTE network and a UTRAN in accordance with at least one embodiment of the present invention.

FIG. 3 shows a heterogeneous network environment including a LTE network and a UTRAN in accordance with at least one embodiment of the present invention.

Referring to FIG. 3, one LTE cell 100 may be overlaid on four UTRAN cells 21 to 24. Since a size of a LTE cell is typically greater than a size of a UTRAN cell, one LTE cell may be overlaid on multiple UTRAN cells. User equipment 700 may be redirected from LTE cell 100 to one of UTRAN cells 21, 22, 23, and 24 when a certain condition meets. First, user equipment 700 may be redirected from LTE cell 100 to one of UTRAN (e.g., WCDMA) cell 21, 22, 23, and 24 when user equipment 700 continuously has comparatively low signal quality for a predetermined duration. User equipment 700 may have such condition when user equipment 700 is located at a boundary area of LTE cells. Second, user equipment 700 may be redirected from LTE cell 100 to at least one of UTRAN cells 21, 22, 23, and 24 when user equipment 700 needs to perform a CS fallback procedure. That is, when user equipment 700 needs to process a voice call, user equipment 700 may be redirected from LTE cell 100 to at least one of UTRAN cells 21, 22, 23, and 24.

When user equipment is redirected from LTE cell 100 to one of UTRAN cells 21, 22, 23, and 24, macro base station 111 of LTE cell 100 may perform a radio resource control (RRC) connection release procedure in order to release connection to corresponding user equipment 700. Such RRC connection release procedure may be initiated by transmitting a RRC connection release message from macro base station 111 to user equipment 700.

The RRC connection release message may include information on frequency allocation (FA) in a UTRAN. Table 1 below shows the RRC connection release message including the network redirection information. As shown, the RRC connection release message may include "RedirectedCarrier Info" in order to include the network redirection information.

TABLE 1

| RRCConnectionRelease-r8-IEs ::= | SEQUENCE { |
| releaseCause | ReleaseCause, |
| redirectedCarrierInfo | RedirectedCarrierInfo |
| } | |

For example, "RedirectedCarrier Infor" may be set to indicate a next service network in Table 2 below.

TABLE 2

| RedirectedCarrierInfo ::= | CHOICE { |
| utra-FDD | ARFCN-ValueUTRA, |
| } | |

For example, a variable "utra-FDD" may indicate FAs available for a related network. When about 2.1 GHz and about 900 MHz are available as FAs, the variable "utra-FDD" may be set as one of about 2.1 GHz and about 900 MHz. The variable "AFRCN-ValueUTRA" may include a value indicating one of about 2.1 GHz and about 900 MHz. After a FA to be used for the next serving network is decided, the variable "AFRCN-ValueUTRA" is set accordingly. "AFRCN-ValueUTRA" may stand for "Absolute Radio Frequency Channel Number (ARFCN)-ValueUTRA." Such variable "ARFCN-ValueUTRA" may be determined according to a frequency allocation technique for load distribution.

In accordance with at least one embodiment of the present invention, radio units may transmit system information of UTRAN cells overlapped with LTE cell 100 to user equipment 700 together with the RRC connection release message.

TABLE 3

| CellInforListUTRA-FDD-r9 :: = SEQUENCE |
| (SIZE (1..maxCellInforUTRA-r9)) OF |
| CellInforUTRA-FDD-r9 |
| Cell InfoUTRAN-FDD-r9 :: = SEQUENCE { |
|     physCellID-r9      physCellIdUTRA-FDD, |
|     utra-BCCH-Container-r9      OCTET STRING |
| } |

As shown in Table 3, a related standard specification may define a RRC connection release message to provide system information of total 16 target cells. Typically, it may be not defined to selectively provide system information of only cells spatially related to user equipment. For example, when user equipment 700 is located at LTE cell 100, user equipment may be interested about system information of only WCDMA cells 21, 22, 23, and 24 as shown in FIG. 3. Accordingly, unnecessary system information may be provided and cause delay in signal processing.

In accordance with at least one embodiment of the present invention, system information may be selectively provided to user equipment. For example, a location of user equipment may be considered to selectively provide system information of related cells.

Figure 4:
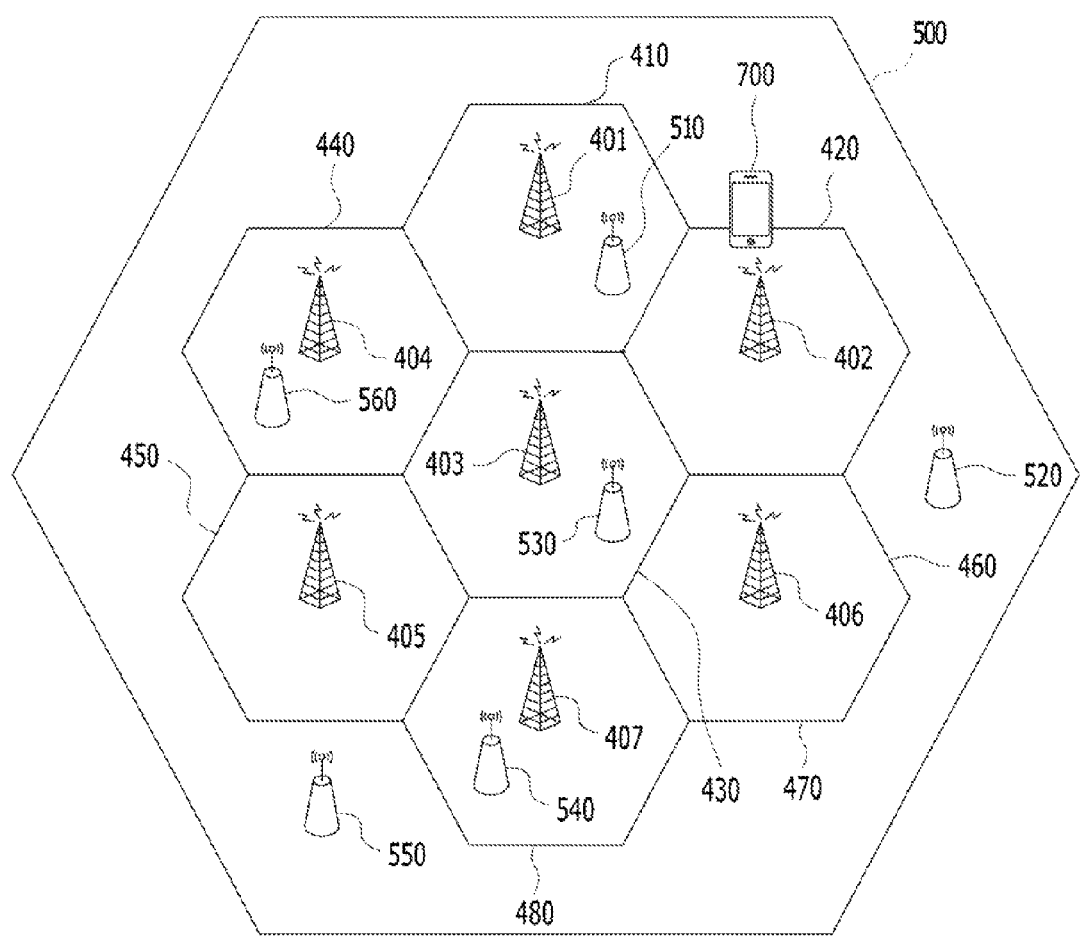
FIG. 4 shows a LTE cell overlaid on multiple UTRAN cells in accordance with at least one embodiment of the present invention.

FIG. 4 shows a LTE cell overlaid on multiple UTRAN cells in accordance with at least one embodiment of the present invention.

Referring to FIG. 4, LTE cell 500 may be overlaid on multiple UTRAN cells 410, 420, 430, 440, 450, 460, 470, and 480. LTE cell 500 may include a plurality of LTE remote radio heads (RRHs) 510, 520, 530, 540, 550, and 560. For example, RRH may be a small sized base station each including a radio unit. As shown, multiple LTE RRHs 510 to 560 may form one LTE cell 500.

Unlike LTE cell 500, each UTRAN cell includes one UTRAN RRH. As shown, UTRAN cell 410 may include UTRAN RRH 401, UTRAN cell 420 may include UTRAN RRH 402, and UTRAN cell 430 may include UTRAN RRH 403. That is, each UTRAN RRH forms one UTRAN cell.

User equipment 700 may be located near to LTE RRH 510. In this case, when user equipment 700 continuously has comparatively low signal quality for a predetermined duration or when user equipment 700 needs to perform a CS fallback procedure, network redirection may be initiated. In this case, system information on UTRAN cells 410 and 420 may be provided to user equipment 700 in order to enable user equipment 700 to select one of UTRAN cells 410 and 420 to be redirected from a serving LTE cell in accordance with at least one embodiment of the present invention. That is, unnecessary system information such as system information on UTRAN cells 440, 450, 460, and 470 are not provided to user equipment 700 in accordance with at least one embodiment of the present invention. Hereinafter, such an apparatus for selectively providing system information in heterogeneous network environment will be described with reference to FIG. 5.

Figure 5:
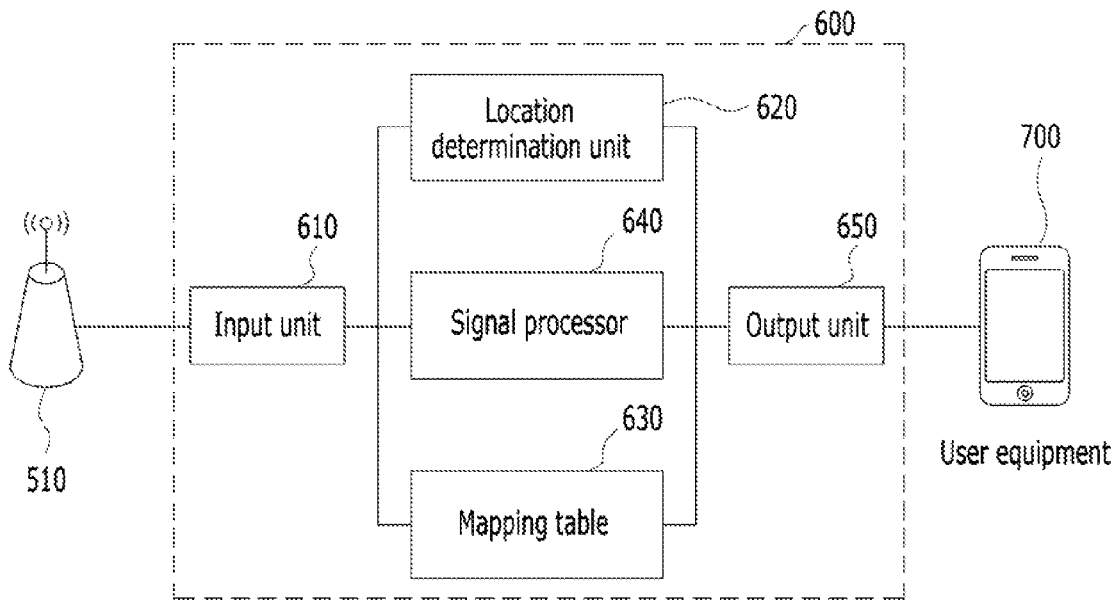
FIG. 5 shows an apparatus for selectively providing system information in heterogeneous network environment in accordance with at least one embodiment of the present invention.

FIG. 5 shows an apparatus for selectively providing system information in heterogeneous network environment in accordance with at least one embodiment of the present invention.

Referring to FIG. 5, apparatus 600 may determine a LTE cell base station near to user equipment 700 and selectively provide system information on UTRAN cells spatially associated with the determined LTE cell base station in accordance with at least one embodiment of the present invention. Such apparatus 600 may be included in a digital unit, but the present invention is not limited thereto. Apparatus 600 may include input unit 610, location determination unit 620, mapping table 630, signal processor 640, and output unit 650.

Input unit 610 may receive uplink signals transmitted from user equipment to a LTE base station. For example, input unit 610 may receive uplink signals transmitted from user equipment 700 through at least one of LTE RRHs 510, 520, 530, 540, 550, and 560. For convenience and ease of understanding, input unit 610 is described as receiving uplink signal from LTE RRH 510 in FIG. 5, but the present invention is not limited thereto. Input unit 610 may receive uplink signals from at least one of LTE RRHs 510, 520, 530, 540, 550, and 560. Input unit 610 may provide the received uplink signals to location determination unit 620.

Location determination unit 620 may extract a pilot signal such as a sounding reference signal (SRS) from the received uplink signal from input unit 610 and detect a LTE RRH located near to user equipment 700 based on the extracted SRS. Location determination unit 620 may transfer information on the detected LTE RRH to signal processor 640.

Figure 6:
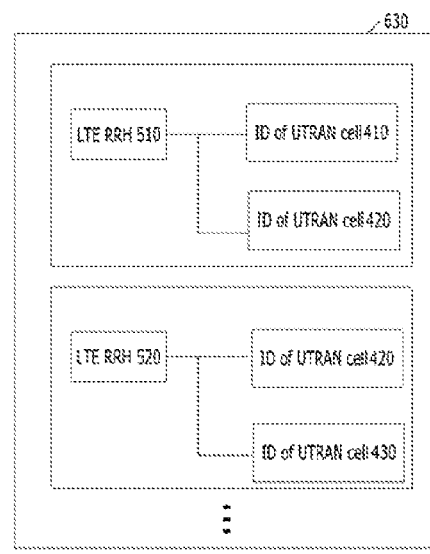
FIG. 6 shows such mapping table 630 in accordance with at least one embodiment of the present invention.

Mapping table 630 may store information on UTRAN cells spatially close to the detected LTE RRH. For example, each LTE RRH may be mapped to UTRAN cells spatially close thereto in mapping table 630. Particularly, UTRAN cell identifiers (IDs) may be mapped to that of each LTE RRH in mapping table 630. FIG. 6 shows such mapping table 630 in accordance with at least one embodiment of the present invention. As shown in FIG. 6, LTE RRH 510 may be mapped to identifiers of UTRAN cells 410 and 420. Furthermore, LTE RRH 520 may be mapped to identifiers of UTRAN cells 420 and 460. Based on such mapping relation between LTE RRHs and UTRAN cells, UTRAN cells spatially closed to each LTE RRH may be determined. Such information on UTRRAN cells associated with a LTE cell may be input into mapping table 630 or modified by an associated operator or system manager, but the present invention is not limited thereto.

Signal processor 640 may receive information on the detected LTE RRH which is located near to user equipment 700 from location determination unit 620. Based on the information, signal processor 640 may extract UTRAN cell information mapped to the detected LTE RRH from mapping table 630. Signal processor 640 may obtain system information of the extracted UTRAN cell information and transmit the obtained system information to user equipment 700 through output unit 650.

Accordingly, user equipment 700 may receive information on UTRAN cells only adjacent to the LTE RRH where user equipment 700 is located. For example, in case of FIG. 4, user equipment 700 may be provided with system information of UTRAN cells 410 and 420. Accordingly, unnecessary system information may be not provided to user equipment 700. Without unnecessary system information, radio resources are not wasted when providing such unnecessary system information and delay caused in processing such unnecessary system information may be reduced in accordance with at least one embodiment of the present invention.

As described above, multiple UTRAN cells may be overlaid on one LTE cell in a heterogeneous network environment. When user equipment needs to perform a CS fallback procedure or when user equipment has comparatively low signal quality due to a location thereof, a network redirection procedure may be initiated from a serving LTE cell to one of UTRAN cells adjacent the serving LTE cell. In order to select one of the UTRAN cells adjacent to the serving LTE cell, system information of the UTRAN cells may be provided. In accordance with at least one embodiment of the present invention, system information of UTRAN cells in a comparatively close distance from user equipment may be provided. Unnecessary system information may not be provided. Such a method of providing system information of UTRAN cells will be described with reference to FIG. 7. For convenience and ease of understanding, it will be described as providing system information when a network redirection procedure is performed from a LTE network to a UTRAN. The present invention, however, is not limited thereto. Embodiments of the present invention may be applied to when a network redirection procedure is performed from a UTRAN to a LTE network. In this case, system information of LTE cells near to a serving UTRAN cell may be provided.

Figure 7:
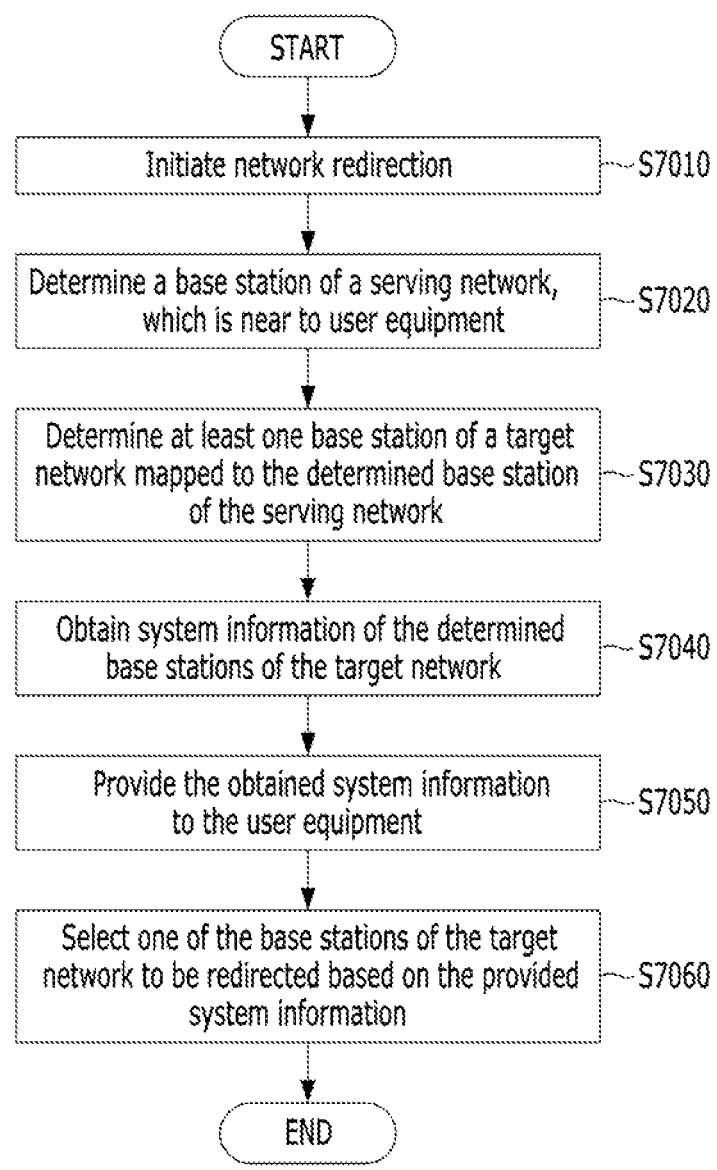
FIG. 7 shows selectively providing system information in a heterogeneous network environment in accordance with at least one embodiment of the present invention.

FIG. 7 shows selectively providing system information in a heterogeneous network environment in accordance with at least one embodiment of the present invention.

Referring to FIG. 7, a network redirection procedure may be initiated at step S7010. A network redirection procedure from a LTE network to a UTRAN may be initiated when user equipment 700 in a heterogeneous network environment needs to perform a CS callback procedure or when such user equipment 700 continuously has comparatively low signal quality for a predetermined duration because of location thereof. For example, user equipment 700 may be located near to LTE RRH 510 as shown in FIG. 4. When user equipment 700 needs to perform a CS fallback procedure or when user equipment 700 continuously has bad signal quality for a predetermined duration, network redirection may be initiated, for example, from LTE RHH 510 to one of UTRAN cells 410 and 420. Furthermore, mapping table 630 may store information on identifiers of UTRAN cells 410 and 420 mapped to LTE RRH 510.

At step S7020, a base station located near to user equipment may be determined. For example, upon the initiation of the network redirection procedure, system information providing apparatus 500 may determine a LTE RRH near to user equipment 700. In order to determine the LTE RRH near to user equipment 700, system information providing apparatus 600 may use a pilot signal such as a sounding reference signal (SRS). Particularly, input unit 610 of system information providing apparatus 600 may receive uplink signals from LTE cell base stations such as LTE RRHs 510, 520, 530, 540, 550, and 560. Location determination unit 620 of system information providing apparatus 600 may extract a SRS from the received uplink signals and determine a LTE RRH located near to user equipment 700 based on the extracted SRS. In case of user equipment 700 in FIG. 4, location determination unit 620 may determine that LTE RRH 510 is located near to user equipment 700 based on the SRS extracted from the uplink signal of LTE RRH 510.

At step S7030, at least one cell of a target network may be determined based on the determined RRH of the serving network. For example, system information providing apparatus 600 may determine UTRAN cells, which are spatially associated with the determined LTE base station. In order to determine the at least one cell of a target network, system information providing apparatus 600 may use mapping table 630 storing information on UTRAN cell mapped to each LTE base station. In case of FIG. 4, mapping table 630 may store information on identifiers of UTRAN cells 410 and 420, mapped to LTE RRH 510. Signal processor 640 of system information providing apparatus 600 may receive the information on determined LTE RRH 510 from location determination unit 620 and extract information on identifiers of UTRAN cell 410 and 420 mapping table 630.

At step S7040, system information of the determined base stations of the target network may be obtained. For example, signal processor 640 may obtain system information of associated UTRAN cells 410 and 420 based on the extracted UTRAN cell identifiers from mapping table 630.

At step S7050, the obtained system information of the UTRAN cells may be provided to user equipment. For example, output unit 650 of system information providing apparatus 600 may receive the obtained system information of the UTRAN cells 410 and 420 from signal processor 640 and transmit the obtained system information to user equipment 700. In order to provide the obtained system information of the UTRAN cells, a RRC connection release message may be used.

At step S7060, user equipment may select one of the base stations of the target network to be redirected based on the provided system information. As described above, system information providing apparatus 600 may provide system information of UTRAN cells 410 and 420, which are only spatially adjacent to LTE RRH 510 where user equipment 700 is located. That is, unnecessary system information is not provided to user equipment 700. Accordingly, radio resources may be prevented from wasting and signal processing delay may be reduced in user equipment 700.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for selectively providing system information in a heterogeneous network environment including a first network overlaid on a second network, the apparatus comprising:
    a location determination unit configured to receive an uplink signal transmitted from user equipment and to determine a first network base station in the first network, which is closer to the user equipment, as compared to other first network base stations in the first network;
    a mapping table configured to store information on at least one second network cell in a second network, which is overlaid on a first network cell of the determined first network base station, and is spatially in a comparatively close distance to the determined first network base station in the first network among, as comparted to other second network cells overlaid on the first network cell of the determined first network base station; and
    a signal processor configured to determine, among the entire second network cells overlaid on the first network cell of the determined first network base station, at least one second network cell spatially close to the determined first network base station based on the mapping table, to obtain system information of the determined at least one second network cell.

2. The apparatus of claim 1, wherein:
    a first network cell of the first network is overlaid on multiple second network cells of the second network in the heterogeneous network environment; and
    one first network cell includes multiple first network radio units and one second network cell includes one second network radio unit.

3. The apparatus of claim 2, wherein the radio unit is a remote radio head.

4. The apparatus of claim 1, wherein the first network is a long term evolution (LTE) network and the second network is a universal mobile telecommunications system radio access network (UTRAN).

5. The apparatus of claim 1, further comprising:
    an input unit configured to receive the uplink signals transmitted from the user equipment and to provide the received uplink signals to the location determination unit.

6. The apparatus of claim 1, wherein the location determination unit is configured to:
    extract one or more sounding reference signals from the received uplink signals; and
    determine the first network base station located near to the user equipment based on each extracted sounding reference signal.

7. The apparatus of claim 1, wherein:
    the mapping table is configured to store identifications of the at least one second network cell spatially close to the determined first network base station; and
    the identifications of the at least one second network cell are mapped to a corresponding first network base station spatially close to the at least one second network cell.

8. The apparatus of claim 1, wherein the signal processor is configured to transmit the obtained system information through a radio resource control (RRC) connection release message.

9. The apparatus of claim 1, wherein the apparatus is included in a digital unit in the first network.

10. The apparatus of claim 1, wherein the location determination unit is configured to determine the first network base station spatially close to the user equipment when the user equipment is redirected from the first network to the second network.

11. A method for selectively obtaining system information in a heterogeneous network environment including a first network overlaid on a second network, the method comprising:
    receiving an uplink signal transmitted from user equipment;
    determining, among a plurality of first network base stations included in a first network cell, one first network base station closer to the user equipment, as compared to the other of the plurality of first network base stations;
    determining, among entire second network cells overlaid on the first network cell of the determined first network base station, at least one second network cell mapped to the determined first network base station based on a mapping table including a mapping relation between the first network base stations and the second network cells; and
    obtaining system information, to be provided to the user equipment, of the determined at least one second network cell,
    wherein the mapping table includes information on one or more overlaid second network cells in the second network spatially in a comparatively close distance to each of the first network base stations included in the first network cell, as compared to other second network cells among the entire second network cells overlaid on the first network cell.

12. The method of claim 11, further comprising, prior to the receiving:
    creating and storing the mapping table.

13. The method of claim 11, wherein:
the first network cell of the first network is overlaid on multiple second network cells of the second network in the heterogeneous network environment; and
one first network cell includes multiple first network radio units and one second network cell includes one second network radio unit.

14. The method of claim 11, wherein the first network is a long term evolution (LTE) network and the second network is a universal mobile telecommunications system radio access network (UTRAN).

15. The method of claim 11, wherein the determining a first network base station includes:
extracting one or more sounding reference signals from the received uplink signals; and
determining the first network base station located near to the user equipment based on each extracted sounding reference signal.

16. The method of claim 11, further comprising, providing the obtained system information to the user equipment, wherein the providing the obtained system information includes:
including the obtained system information in a radio resource control (RRC) connection release message; and
transmitting the RRC connection release message to the user equipment.

17. The method of claim 11, further comprising, prior to the determining a first network base station:
initiating a network redirection procedure that redirects the user equipment from the first network to the second network.

18. The method of claim 17, wherein the network redirection procedure is initiated for at least one of when the user equipment continuously has a comparatively low signal quality for a predetermined duration and when the user equipment performs a circuit switched (CS) fallback procedure.

* * * * *